(12) United States Patent
Berggren et al.

(10) Patent No.: US 9,553,753 B2
(45) Date of Patent: *Jan. 24, 2017

(54) GENERATING SYNCHRONIZATION SIGNALS FOR WIRELESS COMMUNICATION SYSTEMS

(71) Applicant: HUAWEI TECHNOLOGIES CO., LTD., Shenzhen, Guangdong (CN)

(72) Inventors: Fredrik Berggren, Kista (SE); Branislav Popovic, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,478

(22) Filed: Apr. 29, 2016

(65) Prior Publication Data

US 2016/0323134 A1   Nov. 3, 2016

Related U.S. Application Data

(63) Continuation of application No. 14/229,263, filed on Mar. 28, 2014, now Pat. No. 9,356,747, which is a
(Continued)

(51) Int. Cl.
*H04J 3/06* (2006.01)
*H04L 27/26* (2006.01)
(Continued)

(52) U.S. Cl.
CPC .......... *H04L 27/2692* (2013.01); *H04L 5/003* (2013.01); *H04L 27/2602* (2013.01); *H04W 56/001* (2013.01)

(58) Field of Classification Search
CPC ....................................................... H04L 27/26
(Continued)

(56) References Cited

U.S. PATENT DOCUMENTS

| 7,751,490 B2 | 7/2010 | Popovic | |
|---|---|---|---|
| 2008/0310567 A1* | 12/2008 | Popovic | H04L 7/043 375/354 |

(Continued)

FOREIGN PATENT DOCUMENTS

| CN | 101233701 | 7/2008 |
|---|---|---|
| CN | 101299742 | 11/2008 |

(Continued)

OTHER PUBLICATIONS

Office Action, dated Mar. 4, 2016, in corresponding Chinese Application No. 201180073545.X (5 pp.).
(Continued)

*Primary Examiner* — Afshawn Towfighi
(74) *Attorney, Agent, or Firm* — Staas & Halsey LLP

(57) ABSTRACT

The present disclosure relates to a method for facilitating synchronization in a wireless communication system. A number sequence of length L is defined. The number sequence is mapped on a first set of discrete Fourier frequency coefficients. A second set of discrete Fourier frequency coefficients is generated by frequency shifting the first set of discrete Fourier frequency coefficients. The second set of discrete Fourier frequency coefficients is transformed into a time domain signal.

20 Claims, 3 Drawing Sheets

Related U.S. Application Data continuation of application No. PCT/CN2011/080328, filed on Sep. 29, 2011.

(51) Int. Cl.
*H04W 56/00* (2009.01)
*H04L 5/00* (2006.01)

(58) Field of Classification Search
USPC .................................................. 370/330
See application file for complete search history.

(56) References Cited

U.S. PATENT DOCUMENTS

| 2009/0116374 | A1* | 5/2009 | Henriksson ......... H04L 27/2656 |
| | | | 370/203 |
| 2010/0002782 | A1 | 1/2010 | Asanuma et al. |
| 2010/0034305 | A1* | 2/2010 | Popovic .............. H04J 13/0062 |
| | | | 375/260 |
| 2010/0135150 | A1 | 6/2010 | Berggren |
| 2012/0309406 | A1 | 12/2012 | Xu et al. |
| 2015/0103935 | A1 | 4/2015 | Popovic |

FOREIGN PATENT DOCUMENTS

| CN | 101884202 | 11/2010 |
| CN | 102202406 | 9/2011 |
| EP | 1980030 | 8/2010 |
| EP | 2090050 | 1/2011 |
| WO | WO2007/082408 | 7/2007 |
| WO | WO2008/134976 | 11/2008 |
| WO | WO2009/056933 | 5/2009 |

OTHER PUBLICATIONS

Notice of Allowance, dated Jan. 29, 2016, in U.S. Appl. No. 14/229,263.
Office Action, dated Jul. 23, 2015, in U.S. Appl. No. 14/229,263.
Extended European Search Report dated May 29, 2015 in corresponding European Patent Application No. 11872910.2.
Huawei, "Cell-specific signals for initial synchronization and cell identification", 3GPP TSG RAN WG1 LTE Ad Hoc, Helsinki, Finland, Jan. 2006, 12 pp.
Huawei, "P-SCH sequences", TSG RAN WG1 meeting #49, Kobe, Japan, May 2007, 6 pp.
International Search Report issued on Jul. 5, 2012 in corresponding International Patent Application No. PCT/CN2011/080328.
International Search Report mailed Jul. 5, 2012 in corresponding International Patent Application No. PCT/CN2011/080328.
U.S. Appl. No. 14/229,263, filed Mar. 28, 2014, Fredrik Berggren et al., Huawei Technologies Co., Ltd.
Extended European Search Report, dated Nov. 29, 2016, in corresponding European Application No. 16184867.6 (8 pages).

* cited by examiner

GENERATING SYNCHRONIZATION SIGNALS FOR WIRELESS COMMUNICATION SYSTEMS

CROSS-REFERENCE TO RELATED APPLICATIONS

This application is a continuation of U.S. application Ser. No. 14/229,263, filed on Mar. 28, 2014, which is a continuation of International Application No. PCT/CN2011/080328, filed on Sep. 29, 2011. The afore-mentioned patent applications are hereby incorporated by reference in their entireties.

TECHNICAL FIELD

The present disclosure relates to a method for generating synchronization signals for wireless communication systems. Furthermore, the disclosure also relates to a computer program, a computer program product, a signal processing device, and a receiver device.

BACKGROUND OF THE DISCLOSURE

A fundamental acquisition procedure in a cellular wireless system is the cell search, which is performed by a mobile terminal for obtaining time synchronization and frequency synchronization to a cell in the network and detecting its cell identity. Cell search is enabled by the detection of synchronization signals transmitted from a base station.

The cell search is regarded as a procedure demanding much complexity and power in the mobile terminal, since finding synchronization requires correlators (i.e., matched filters) performing complex valued multiplications (due to matching the received signal to a replica signal). It is therefore crucial to design the synchronization signal such that low-complex receiver implementations of the cell searcher can be used.

A further objective of the synchronization signal is to enable detection at very low Signal-to-Interference-plus-Noise-Ratios (SINRs). Low SINRs often occur at the cell edge and the coverage of the cell is implicitly dependent on whether the synchronization signal can be detected. However, low SINRs may not only occur at distances far from the transmitter. High interference situations may be common in heterogeneous network deployments, i.e., where small low-power cells (e.g. pico cells, femto cells, Home eNodeBs etc.) are deployed at the same carrier frequency as a high-power macro cell and in its coverage region.

In heterogeneous network deployments the experienced SINRs at a mobile terminal may become much smaller than what is currently seen in homogeneous macro cell deployments. It is therefore a problem to provide synchronization signals that can be detected under severe interference conditions with a dominant interferer, while at the same time exhibit a structure that allows low-complex detectors.

For such deployments, system performance can be improved by allowing a mobile terminal (e.g. a User Equipment, UE) to connect to the pico cell, although the received power from the pico cell is smaller than for the macro cell. In that case, a UE that is connected to a pico cell may experience a stronger signal (i.e., large interference) from the macro cell, which implies that the SINRs at the UE could be much less than 0 dB. This cell-association procedure is sometimes referred to as cell range expansion and can be achieved by adding a bias value in the cell selection criterion. FIG. 1 illustrates a heterogeneous network deployment, where received signal strength from a macro cell is larger than a received signal strength from a pico cell, if a mobile terminal is located in the cell range expansion region.

The macro cell is regarded as a dominant interferer for UEs that are in the range expansion zone. These severe interference situations could be handled for data channels by coordinated scheduling between the macro cell and the pico cell. However, there are typically no means for interference coordination of the synchronization channels, which makes synchronization a problem.

For example, in a 3GPP LTE Rel-10 system, a primary synchronization signal is transmitted on 62 subcarriers; 31 subcarriers directly below and above the DC subcarrier, respectively. This applies to all cells in the system. Hence, synchronization signals from different cells are always overlapping in frequency. This constitutes no major problem for homogeneous network deployments. However, for a frame synchronous heterogeneous network deployment, the system has no means for avoiding the strong interference caused by a synchronization signal from a macro cell colliding with the synchronization signal of the pico cell.

Patent documents U.S. Pat. No. 7,751,490, EP2090050 and EP1980030 disclose synchronization signals enabling low-complex receiver implementations. A centrally symmetric number sequence $d_u[n]$, $n=0, 1, \ldots, L-1$, where L is odd, has its central element $n=(L-1)/2$ punctured. The punctured number sequence is mapped to a set of discrete Fourier frequency coefficients $H_u[l]$, $l=0, 1, \ldots, N-1$, such that the Fourier coefficients are symmetric around $l=0$, i.e., $H_u[1+p]=H_u[1-p]=H_u[1-p+N]$, where p is an integer and where the last equality follows from the periodicity of the discrete Fourier transform. The mapping can thus be described by $$H_u[l] = \begin{cases} 0, & l = 0 \\ d_u\left[l + \frac{L-1}{2}\right], & l = 1, 2, \ldots, \frac{L-1}{2} \\ d_u\left[l - N + \frac{L-1}{2}\right], & l = N - \frac{L-1}{2}, \ldots, N-1 \\ 0, & \text{elsewhere.} \end{cases}$$

When generating the continuous time-domain base-band signal, the discrete frequency $l=0$ corresponds to the DC subcarrier, i.e., the center frequency of the carrier. By such construction, the discrete time-domain base band signal $$s_u[k] = \frac{1}{N}\sum_{n=0}^{N-1} H_u[n]W_N^{-kn}, k = 0, 1, \ldots, N-1$$

$$W_N = \exp\left(-\frac{j2\pi}{N}\right), j = \sqrt{-1}$$

becomes centrally symmetric, $s_u[k]=s_u[N-k]$, $k=1, 2, \ldots, N-1$. This property can be used in an implementation to reduce the number of complex valued multiplications.

Furthermore, for a complex conjugated sequence pair u and ú, where $d_{\acute{u}}=d_u^*[n]$, it follows that $s_{\acute{u}}[k]=s_u^*[k]$. Also this property can be used in an implementation to reduce the number of complex valued multiplications.

SUMMARY

According to an aspect of the disclosure, a method for facilitating synchronization in a wireless communication system is provided. The method comprising the steps of:

defining a number sequence $d_u[n]$, n=0, 1, ..., L−1, the length of the number sequence being L, the number sequence being centrally symmetric around an element n=(L−1)/2 of the number sequence, L being an odd positive integer and n denoting an element index of the number sequence;

mapping the number sequence on a first set of discrete Fourier frequency coefficients $\tilde{H}_u$;

generating a second set of discrete Fourier frequency coefficients $H_u$ by frequency shifting the first set of discrete Fourier frequency coefficients $\tilde{H}_u$ by in shifts, where m is an integer except zero; and transforming the second set of discrete Fourier frequency coefficients $H_u$ into a time domain signal.

According to another aspect of the disclosure, a method for transmitting a synchronization signal in a wireless communication system is provided. The method comprising the step of:

transmitting one or more synchronization signals generated according to the disclosure in a wireless communication system.

According to yet another aspect of the disclosure, a method for synchronization in a wireless communication system is provided. The method comprising the steps of:

receiving one or more synchronization signals transmitted according to a method for transmitting synchronization signals according to the disclosure;

demodulating said one or more synchronization signals; and synchronizing using said demodulated one or more synchronization signals.

The disclosure also relates to a computer program, a computer program product, a signal processing device, and a receiver device.

The present disclosure provides synchronization signals which facilitate good detection performance at low SINRs, and which may be demodulated using low-complex methods.

Further applications and advantageous of the disclosure will be apparent from the following detailed description.

BRIEF DESCRIPTION OF THE DRAWINGS

The appended drawings are intended to clarify and explain different embodiments of the present disclosure in which.

DETAILED DESCRIPTION OF EMBODIMENTS

Figure 1:
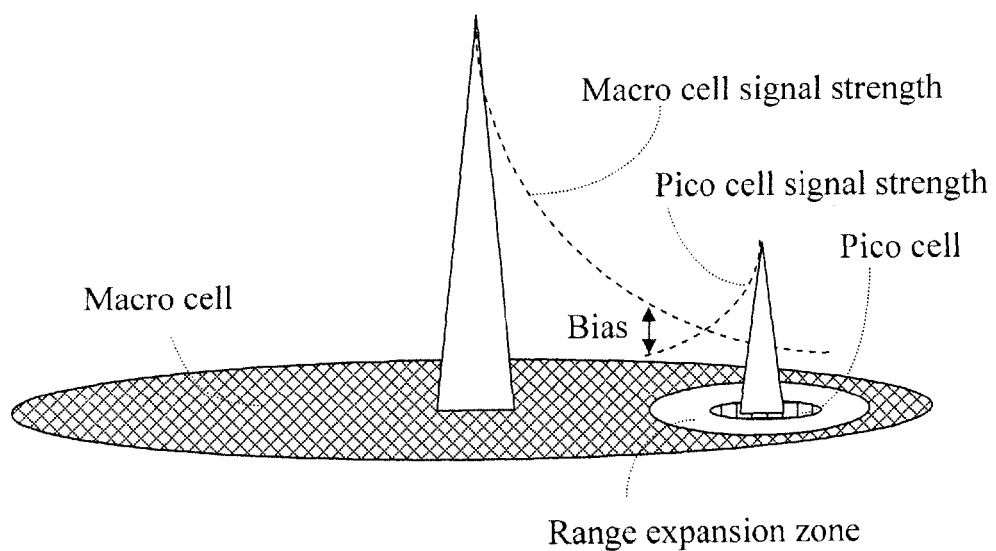
FIG. 1 illustrates a heterogeneous network deployment where mobile terminals are connected to a pico cell in the range expansion zone while the received power is stronger from the macro cell.

One way to assure that the synchronization signal can be detected at low SINRs is to reduce the interference. Such reduction could be achieved by transmitting synchronization signals from different cells on mutually orthogonal frequency resources. The network could then be planned such that strong interference is avoided. In a heterogeneous deployment, this would ensure that the synchronization signal transmitted from a macro cell does not become interference to a closely located pico cell. In this disclosure, the objective is achieved by a synchronization signal that can be located at an arbitrary frequency position (e.g. subcarriers) while comprising signal properties that allow low-complex receivers.

This is achieved by a method for generating synchronization signals for wireless communication systems according to the present disclosure. The method comprises the steps of:

defining a number sequence $d_u[n]$, n=0, 2, ..., L−1 of length L, said number sequence being centrally symmetric around the element n=(L−1)/2 of said number sequence, L being an odd positive integer and n denoting element index;

mapping said number sequence on a first set of discrete Fourier frequency coefficients $\tilde{H}_u$;

generating a second set of discrete Fourier frequency coefficients $H_u$ by frequency shifting said first set of discrete Fourier frequency coefficients $\tilde{H}_u$ by in shifts, where m is an integer except zero; and transforming said second set of discrete Fourier frequency coefficients $H_u$ into a time domain signal.

Thereby a time domain synchronization signal is provided having properties so as to being detected using low-complex detection methods and which also has good detection performance at low SINRs, e.g. in heterogeneous network deployment scenarios. The following disclosure discusses the above advantageous properties and other aspect of the disclosure.

Discrete Time-Domain Base-Band Synchronization Signal

Suppose a discrete time-domain base band signal is obtained (by transformation) as $$s_u[k] = \frac{1}{N} \sum_{n=0}^{N-1} H_u[n] W_N^{-kn}, k = 0, 1, \ldots, N-1$$

$$W_N = \exp\left(-\frac{j2\pi}{N}\right), j = \sqrt{-1}$$

for a set of Fourier frequency coefficients $H_u[l]$, l=0, 1, ..., N−1.

Consider an odd-length number sequence $d_u[n]$, n=0, 1, ..., L−1, which is centrally symmetric around the element n=(L−1)/2, i.e., $d_u[n]=d_u[L-1-n]$. The number sequence is mapped to the Fourier frequency coefficients according to $$\tilde{H}_u[l] = \tilde{H}_u[(l+m) + \mod N] \quad (2)$$

where $$\tilde{H}_u[l] = \begin{cases} d_u\left[l + \frac{L-1}{2}\right], & l = 0, 1, \ldots, \frac{L-1}{2} \\ d_u\left[l - N + \frac{L-1}{2}\right], & l = N - \frac{L-1}{2}, \ldots, N-1 \\ 0, & \text{elsewhere.} \end{cases} \quad (3)$$

and m is an integer value. Hence, a first set of centrally symmetric discrete Fourier frequency coefficients R=0, 1, ..., N−1) is defined and a second set of discrete Fourier frequency coefficients $H_u=(H_u[l],l=0, 1, \ldots, N-1)$ is generated by frequency shifting the first set of discrete Fourier frequency coefficients $\tilde{H}_u$ according to equation (2).

Further, the integer value m corresponds to a frequency shift of m subcarriers of the synchronization signal. Compared to conventional art, the number sequence may not be punctured at its central element. It follows using equation (3) and the periodicity of the Fourier transform that $$\tilde{s}_u[N-k] = \frac{1}{N}\sum_{n=0}^{N-1}\tilde{H}_u[n]W_N^{kn}$$
$$= \frac{1}{N}\sum_{n=1}^{N}\tilde{H}_u[N-n]W_N^{-kn}$$
$$== \frac{1}{N}\sum_{n=0}^{N-1}\tilde{H}_u[N-n]W_N^{-kn}$$
$$= \tilde{s}_u[k],$$
$$k=1, 2, \ldots, N-1.$$

Hence, $\tilde{s}_u[k]$ is a centrally symmetric signal, where each sample, except k=0, has a symmetric counterpart. It can further be shown from the property of the discrete Fourier transform that $$s_u[k]=W_N^{mk}\tilde{s}_u[k]. \quad (4)$$

Hence, the disclosed synchronization signal comprises a centrally symmetric signal $\tilde{s}_u[k]$ modulated by a complex-valued exponential function $W_N^{mk}$. It can also be shown using (4) and the central symmetry of $\tilde{s}_u[k]$ that $$s_u[N-k]=W_N^{-mk}\tilde{s}_u[k]=W_N^{-2mk}s_u[k]. \quad (5)$$

Furthermore, for a complex conjugated sequence pair u and ú, where $d_ú[n]=d_u^*[n]$, it follows that $\tilde{s}_ú[k]=\tilde{s}_u^*[k]$. Hence, using (4) we obtain $$s_ú[k]=W_N^{mk}s_u^*[k]=W_N^{2mk}s_u^*[k] \quad (6)$$

From (4)-(6), we can further obtain $$s_ú[N-k]=W_N^{-2mk}s_ú[k]=W_N^{-mk}s_u^*[k]=s_u^*[k]. \quad (7)$$

Equation (6) and (7) show that the sequence with root ú can be detected with a filter matched to $\tilde{s}_u^*[k]$ while the sequence with root u can be detected with a filter matched to $\tilde{s}_u[k]$. This can be used in an implementation to reduce complexity, since no new complex multiplications may be needed to for matching the signal to $\tilde{s}_u^*[k]$ once it has been matched to $\tilde{s}_u[k]$.

The synchronization signal (4) inherits the correlation properties of $\tilde{s}_u[k]$ which can be realized by considering the periodic auto-correlation function $$\rho(\Delta) = \left|\sum_{n=0}^{N-1}s[n]s^*[(n+\Delta)\bmod N]\right|$$
$$= \left|\sum_{n=0}^{N-1}W_N^{mn}\tilde{s}[n]W_N^{-m(n+\Delta)}\tilde{s}^*[(n+\Delta)\bmod N]\right|$$
$$= \left|\sum_{n=0}^{N-1}\tilde{s}[n]\tilde{s}^*[(n+\Delta)\bmod N]\right|.$$

Continuous Time Domain Base-Band Synchronization Signal

Suppose a set of Fourier frequency coefficients are defined as $$\tilde{H}_u[l] = \begin{cases} d_u\left[l+\frac{L-1}{2}\right], & l=0,1,\ldots,\frac{L-1}{2} \\ d_u\left[l+\frac{L-1}{2}\right], & l=-\frac{L-1}{2},\ldots,-1 \\ 0, & \text{elsewhere.} \end{cases} \quad (8)$$

with $$H_u[l]=\tilde{H}_u[(l+m)\bmod N]. \quad (9)$$

The continuous base-band OFDM signal (excluding the cyclic prefix) can be generated by $$s_u(t) = \sum_{k=-N/2}^{N/2-1}H_u[k]\cdot e^{j2\pi k\Delta ft}, 0\le t<\frac{1}{\Delta f}=N\cdot T_s \quad (10)$$

where $T_s$ is the sampling period, $\Delta f$ the subcarrier spacing and $N=1/T_s\Delta f$. Equivalently, N is the number of subcarriers of the OFDM signal. For notational simplicity, it is assumed that N is even and a person skilled in the art may generalize the representation to odd N. In conventional art LTE system N=2048 for $\Delta f=15$ kHz. The RF signal is obtained by modulating the base-band OFDM signal such that the DC subcarrier (i.e., frequency k=0) of the transmitted signal corresponds to the carrier frequency.

From (9) and (10) we further have $$s_u(t) = \sum_{k=-N/2}^{N/2-1}\tilde{H}_u[k]\cdot e^{-j2\pi m\Delta ft}\cdot e^{j2\pi k\Delta ft}. \quad (11)$$

Due to the periodicity of the complex sinusoid in equation (9), and the symmetry of the mapping in equation (7), we obtain $$s_u\left(\frac{1}{\Delta f}-t\right) = e^{-j2\pi m\Delta f\left(\frac{1}{\Delta f}-t\right)}\sum_{k=-N/2}^{N/2-1}\tilde{H}_u[k]\cdot e^{j2\pi k\Delta f\left(\frac{1}{\Delta f}-t\right)} \quad (12)$$
$$= e^{j2\pi m\Delta ft}\cdot\sum_{k=-N/2}^{N/2}\tilde{H}_u[k]\cdot e^{-j2\pi k\Delta ft}$$
$$= e^{j2\pi m\Delta ft}\cdot\sum_{k=-N/2}^{N/2}\tilde{H}_u[k]\cdot e^{j2\pi k\Delta ft}$$
$$= s_u(t)\cdot e^{4\pi m\Delta ft}.$$

In this way we have shown that continuous time-domain signal also features a sort of symmetry as its discrete counterpart (5). Furthermore, the symmetry for complex conjugated sequence pairs is also maintained, since $$\tilde{s}_u(t) = \sum_{k=-N/2}^{N/2-1}\tilde{H}_u[k]e^{j2\pi k\Delta ft} \quad (13)$$

-continued $$= e^{j2\pi m \Delta f t} \sum_{k=-N/2}^{N/2-1} H_u[k] e^{j2\pi k \Delta f t}$$

$$= e^{j2\pi m \Delta f t} s_u(t)$$

we can write $$s_u(t) = \sum_{k=-N/2}^{N/2-1} H_u^*[k] e^{j2\pi k \Delta f t} \qquad (14)$$

$$= \sum_{k=-N/2}^{N/2-1} \tilde{H}_u^*[k] \cdot e^{-j2\pi m \Delta f t} \cdot e^{j2\pi k \Delta f t}$$

$$= e^{-j2\pi m \Delta f t} \sum_{k=-N/2}^{N/2-1} \tilde{H}_u^*[k] \cdot e^{-j2\pi k \Delta f t}$$

$$= e^{-j4\pi m \Delta f t} \cdot s_u^*(t)$$

It is further noted that the sample rate in the receiver is often not specified by the radio standards. In conventional art LTE system, the synchronization signal occupies only 63 subcarriers, including the DC subcarrier. Hence the sample rate in the cell searcher could be considerably less than N=2048 samples per OFDM symbol. In the following receiver embodiments, it is assumed that IV corresponds to an appropriately chosen sampling rate at the receiver.

It should be realized from the above disclosure that synchronization signals according to the disclosure may be used in 3GPP E-UTRA systems, such as LTE or LTE-Advanced. Preferably as primary synchronization signals in such systems.

The present disclosure further provides a method for synchronization in a wireless communication system. The method comprises the steps of: receiving synchronization signals as described above; demodulating the received synchronization signals; and synchronizing using the demodulated synchronization signals. The following part of the description describes different low-complex embodiments for demodulating synchronization signals according to the disclosure.

Low-Complexity Synchronization Signal Detection/Demodulation

Figure 2:
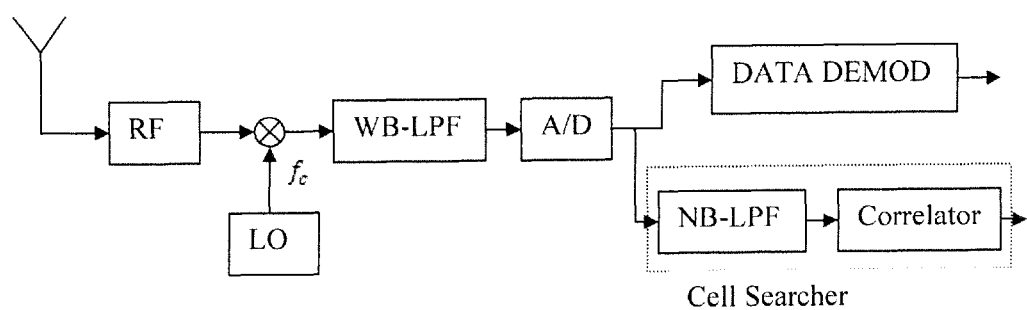
FIG. 2 schematically shows a principal receiver chain for a cell searcher in accordance with a non-limiting embodiment of this disclosure.

In the cell search procedure, the UE acquires frequency synchronization by sequentially adjusting its local oscillator to be in accordance with carrier frequencies supported by the system until the synchronization signal is detected. In the conventional art LTE system, carrier frequencies $f_{LTE}$ are defined on a raster with 100 kHz spacing. A principal receiver chain is illustrated in FIG. 2, where the local oscillator (LO) is mixed with the input RF signal. The resulting intermediate RF signal is typically followed by an analog wideband low-pass filter (WB-LPF) for the selection of LTE band. The LPF is typically followed by the A/D conversion. A narrow-band low-pass filter (NB-LPF) may also be deployed before the correlator to extract subcarriers carrying the synchronization signal only. The correlator comprises a matched filter which for each sample performs a multiplication of the received signal with the transmitted signal, i.e. a replica signal, in order to integrate signal energy for detecting the correct timing sample.

Demodulation with Local Oscillator Frequency $f_{LO}$ Corresponding to $f_c = f_{LTE} + m \cdot \Delta f$ In one embodiment of a receiver method according to the disclosure, low-complexity synchronization signal detection is facilitated by that the receiver demodulates the received continuous time-domain signal by using a local oscillator frequency that is associated with the discrete frequency $f_c = f_{LTE} + m \cdot \Delta f$. For the received sampled base-band signal, this will equivalently imply that the term $W_N^{mk}$ in equation (4) is cancelled. The baseband discrete signal will thus appear as $s_u[k] = \tilde{s}_u[k]$ in the receiver. Hence, the received signal in the correlator will have a central symmetric property, although the transmitted signal is not central symmetric. In this embodiment, it is advantageous that the transmitted signal does not contain a modulation symbol on base-band frequency k=m, since the local oscillator of the receiver may create severe distortion at the center frequency of the receiver. Thus in an embodiment of the disclosure, the number sequence is additionally characterized by that the central element of the number sequence assumes $d_u[(L-1)/2] = 0$.

In conventional art 3GPP E-UTRA (LTE) system, all synchronization signals are mapped around the LTE carrier frequency, i.e., m=0, where the carrier frequency $f_{LTE}$ can have a number of different possible values, defined by the LTE cellular standard on a raster with 100 kHz spacing. If the new synchronization signals defined by the present disclosure are mapped symmetrically around some non-zero base-band frequency m≠0 for which the RF signal corresponds to one of the frequencies on the 100 kHz raster, then there is a further advantage of a number sequence with a central element being zero. In that case the same synchronization signal detector can be used in the new UEs (m≠0) and in legacy UEs (m=0), by setting the local oscillator in the new UEs to the frequency $f_c = f_{LTE} + m \cdot \Delta f$. On the other hand, if the base-band frequency in is not one of the frequencies on 100 kHz raster, then the new UEs have to search all the frequencies in an LTE band, which significantly increases implementation complexity, power consumption and average cell search time.

Demodulation with Local Oscillator Frequency $f_{LO}$ Corresponding to $f_c = f_{LTE}$ In another embodiment of the disclosure, low-complexity synchronization signal detection is facilitated by that the receiver demodulates the received continuous time-domain signal by using a local oscillator frequency that is the same as one of possible LTE carrier frequencies defined by the LIE standard, i.e., corresponds to the discrete base-band frequency k=0. The received baseband signal then becomes as in equation (4).

For this kind of RF demodulation the following three preferred embodiments are disclosed for reducing the complexity of the synchronization detection.

a) Addition of Symmetrical Samples Prior to Multiplication

The disclosed synchronization signal allows a reduction of the multiplication complexity in the receiver. This can be exemplified as follows. Consider the correlation value $\rho(0) = |\Sigma_{k=0}^{N-1} r[k] s^*[k]|$, which represents the output value from a matched filter (correlator) at the correct timing. Due to the central symmetry of $\tilde{s}_u[k]$, we can identify the pairs of products in the correlation sum for $$k = 1, 2, \ldots, \frac{N}{2} - 1,$$

where N is even, using (4) and (5)

$$r_u[k]s_u^*[k]+r_u[N-k]s_u^*[N-k]=(W_N^{-mk}r_u[k]+W_N^{mk}r_u[N-k])s_u^*[k].$$

In right hand side of the above expression the input samples multiplied with the complex exponential functions are added prior to multiplication with the replica signal $\tilde{s}_u^*[k]$. A skilled reader can deduce the similar relation for a root index $\tilde{u}$. An advantage of this representation is that it can use filter coefficients corresponding to $\tilde{s}_u^*[k]$, which is already applied in the cell searcher for legacy terminals for detecting synchronization signals at m=0. An alternative representation is $$r_u[k]s_u'[k]+r_u[N-k]s_u'[N-k]=(r_u[k]+W_N^{-2mk}r_u[N-k])s_u'[k],$$

which would yield another set of filter coefficients $\tilde{s}_u^*[k]$.

Figure 3:
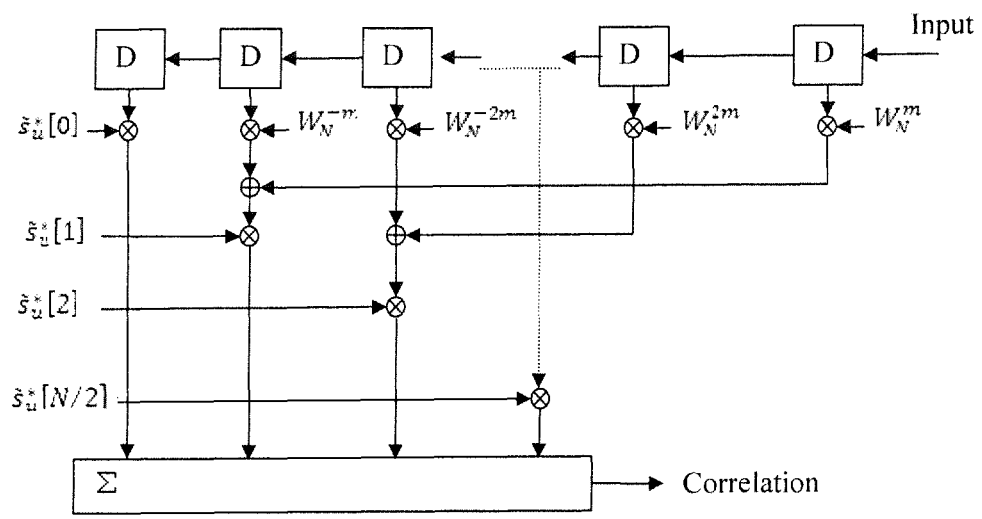
FIG. 3 schematically shows an example of a correlator for low complexity detection in accordance with a non-limiting embodiment of this disclosure.

Since the multiplication with $W_N^{\pm mk}$ only implies a phase shift, the above expression can be implemented equivalently to 1 complex multiplication. The correlation value ρ(0) can thus be computed with less than N multiplications. FIG. 3 illustrates a correlator (matched filter with tap delays D) utilizing the pair-wise symmetry of input samples as described. Hence, the pair-wise symmetric input samples multiplied with the complex exponential functions are added prior to multiplication with the replica signal.

b) Base-Band Mixer Pre-Processing

Figure 4:
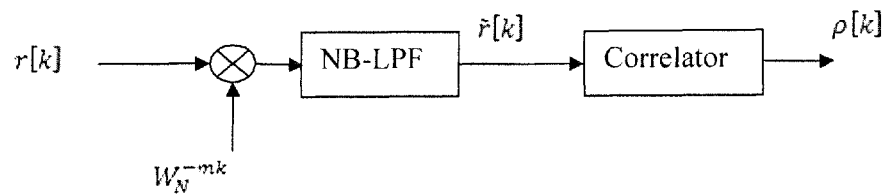
FIG. 4 schematically shows pre-processing of an input signal to the correlator by a base band mixer in accordance with a non-limiting embodiment of this disclosure.

By mixing the received discrete base-band signal with $W_N^{-mk}$ (i.e. a complex exponential function having a periodicity depending on m) prior to the input of the correlator, the synchronization can be pre-processed as in FIG. 4. The mixing in FIG. 4 is performed on the discrete base-band signal in order to cancel the complex exponential term $W_N^{mk}$ of the received signal.

If present, the narrow-band low-pass filter for selection of synchronization signal should be applied after the base-band mixer. This is an advantage as it allows using the same filter when detecting a synchronization signal with m≠0 and m=0.

Figure 5:
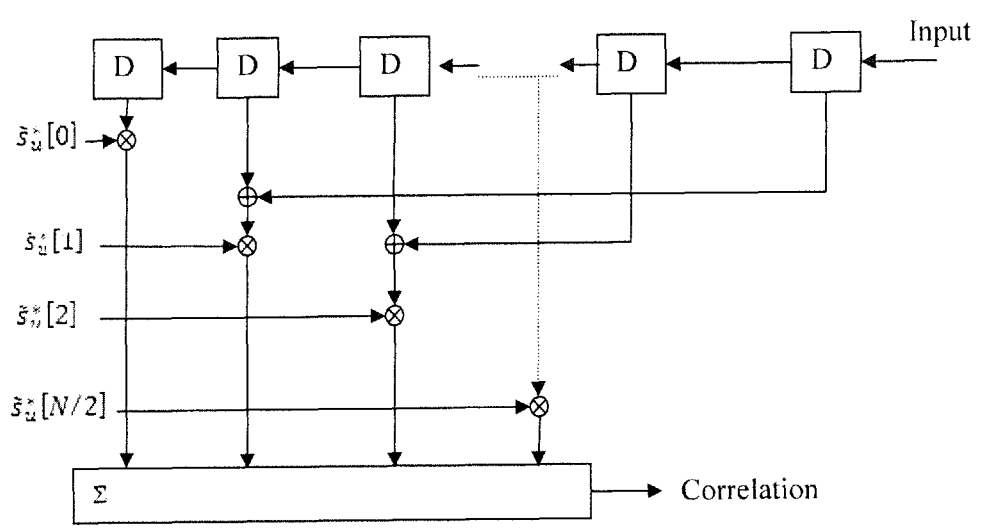
FIG. 5 schematically shows another example of low-complexity detection in accordance with a non-limiting embodiment of this disclosure.

An advantage of this pre-processing is that the correlator could comprise a filter matched to $\tilde{s}[k]$, which is a centrally symmetric signal according to the conventional art in cited patent documents. FIG. 5 illustrates the correlator structure where the input comprises the pre-processed signal i[k]. According to FIG. 5 pair-wise symmetric input samples are added prior to multiplication with the replica signal.

Since the mixer continuously performs a multiplication on the received signal, there is an arbitrary but fixed delay p between the mixer and the received signal. This delay is unknown to the receiver and cannot be compensated for. Taking this effect into account, the input to the correlator may be described as $W_N^{-m(k+p)}r[k]$ When r[k]=s[k], the correlation function becomes $$\rho(\Delta) = \left|\sum_{n=0}^{N-1} W_N^{-m(n+p)} s[n]\tilde{s}^*[(n+\Delta)\mathrm{mod}N]\right|$$

$$= \left|\sum_{n=0}^{N-1} W_N^{-m(n+p)} W_N^{mn}\tilde{s}[n]\tilde{s}^*[(n+\Delta)\mathrm{mod}N]\right|$$

$$= \left|\sum_{n=0}^{N-1} \tilde{s}[n]\tilde{s}^*[(n+\Delta)\mathrm{mod}N]\right|.$$

Hence, the correlation properties of c[k] are inherited and the low-complex receiver structures of conventional art can be utilized.

c) Block Processing of Correlator Input

The advantages of the mixer pre-processing could also be achieved by a block processing method. In general, a correlator may take a block of r[k], k=0, 1, . . . , N−1, input samples. Suppose $\tilde{r}[k]=W_N^{-mk}r[k]$ denotes a pre-processed received signal containing N samples in the z:th block and that the z+1:th block comprises samples k=1, . . . , N, which are pre-processed as $\tilde{r}[k]=W_N^{-(k-1)}r[k]$, k=1, . . . N. When a block comprises the N samples of the synchronization signal $r[k]=s[k]=W_N^{mk}\tilde{s}[k]$, the input to the correlator essentially becomes $\tilde{s}[k]$. Thus for any such block, a correlator can constitute a filter being matched to $\tilde{s}[k]$.

For the z:th block, the set of pre-processed signal values are $$\{r[0], W_N^{-m}r[1], W_N^{-2m}r[2], \ldots, W_N^{-(N-1)m}r[N-1]\}$$

and for the z+1:th block $$\{r[1], W_N^{-m}r[2], W_N^{-2m}r[3], \ldots, W_N^{-(N-1)m}r[N]\}.$$

It is thus realized that the pre-processed signal values for z+1:th block can be obtained from the z:th block, by:

Replacing r[0] with r[1]

Multiplying the remaining signal values in the z:th block by $W_N^m$

Inserting $W_N^{-(N-1)m}r[N]$

This allows reduction of the implementation complexity of a block since $W_N^m$ is a complex-valued constant (i.e., a phase shift) and only one complex multiplication is needed, i.e., due to $W_N^{-(N-1)m}r[N]$.

Frequency Shift

Any integer valued frequency shift m is applicable to the present disclosure. In one embodiment, the values of m are associated with carrier frequencies specified by the system. That means that $\tilde{H}_u[0]$ (which comprises $d_u[(L-1)/2]$) is after the m shifts, mapped to a Fourier frequency coefficient in the set $H_u$, which when used in the RF signal, corresponds to a carrier frequency $f_c$ of the system. The disclosed synchronization signal will thus be located on the carrier-frequency raster of the system, e.g., a frequency $f_{LTE}$, which allows that existing cell search implementations could be utilized. In that case, the legacy mobile terminal may detect the new synchronization signals and erroneously assume that the central frequency of the new synchronization channel corresponds to the carrier frequency of the LTE system.

This problem can be solved by allocating different sequences to new synchronization signals, where new synchronization sequences have low cross-correlation with the legacy synchronization sequences. In that case the legacy UEs will be prevented from erroneously detecting the center frequency of the new synchronization channel because their correlators will not detect the synchronization sequences of new synchronization signals. One way to define new sequences for new synchronization signals is to associate the root indices of Zadoff-Chu sequences with the frequency shifts m.

In a heterogeneous network deployment, it might be useful that a pico cell broadcasts multiple synchronization signals, positioned at different frequency offsets m. The synchronization signal detection is typically a problem within the range expansion zone, i.e., where the interference is strong. Terminals being closer to the pico cell than the range expansion zone may be able to detect a synchronization signal from the pico cell that is being transmitted on the same frequency resources as a synchronization signal from the macro cell, i.e., at m=0. The legacy terminals may only be capable of detecting synchronization signals where m=0, which could be possible if they are connected to the pico cell but are not in the range expansion zone. It is therefore an advantage to transmit synchronization signals at different frequency locations since it allows both new and legacy terminals to access the pico cell. If there would be no synchronization signal transmitted at frequency m=0, no legacy terminals could access the pico cell.

In another embodiment, multiple synchronization signals are transmitted, either in different OFDM symbols or within the same OFDM symbol. This is an advantage to legacy terminals that only assume synchronization signals are located around a carrier frequency corresponding to m=0. Hence, it is disclosed that several values m=$m_0$,m=$m_1$ ... are deployed in different OFDM symbols or within the same OFDM symbol. It is understood that different synchronization signals should not overlap in frequency within an OFDM symbol. The values used m=$m_0$,m=$m_1$ ... may be predetermined or signaled to the receiver.

In yet another embodiment, the values of frequency shift m are not associated with carrier frequencies specified by the system. That means that $\tilde{H}_u[0]$ (which comprises $d_u[(L-1)/2]$) is after the m shifts, mapped to a Fourier frequency coefficient in the set $H_u$, which when used in the RF signal, corresponds to a frequency $f_c$ not being used as a carrier frequency of the system. The disclosed synchronization signal will thus not be located on the carrier-frequency raster of the system. This is an advantage since legacy UEs, i.e., UEs that are only searching for synchronization signals with m=0, will not be able to detect a synchronization signal with m≠0. This prevents such a legacy UE for erroneously detecting the center frequency of the carrier. In that case no new synchronization sequences are needed.

Number Sequence

Any complex valued or real valued centrally symmetric number sequence $d_u[n]$, n=0, 1, ..., L-1 is applicable to the present disclosure. In one non-limiting embodiment, the number sequence is a Zadoff-Chu sequence of length 63 with root indices u=25, 29 and 34. This has the advantage that the same correlator could be utilized as in a legacy 3GPP LTE system. However, according to another non-limiting embodiment, the number sequence is a Zadoff-Chu sequence of length 63 with root indices other than the mentioned above. As described above, this is an advantage to prevent legacy UEs for detecting a new synchronization signal when m+0.

Furthermore, as understood by a person skilled in the art, any method according to the present disclosure may also be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the methods above may be implemented in suitable devices.

Hence, a signal processing device according to a non-limiting embodiment of the disclosure comprises:

means for defining a number sequence $d_u[n]$, n=0, 1, ..., L-1 of length L, said number sequence being centrally symmetric around the element n=(L-1)/2 of said number sequence, L being an odd positive integer and n denoting element index;

means for mapping said number sequence on a first set of discrete Fourier frequency coefficients $\tilde{H}_u$;

means for generating a second set of discrete Fourier frequency coefficients $H_u$ by frequency shifting said first set of discrete Fourier frequency coefficients $\tilde{H}_u$ by m shifts, where m is an integer except zero; and means for transforming said second set of discrete Fourier frequency coefficients $H_u$ into a time domain signal.

While a receiver device for receiving synchronization signals in a wireless communication system according to a non-limiting embodiment of the disclosure comprises:

means for receiving one or more synchronization signals according to the present disclosure;

means for demodulating said one or more synchronization signals; and means for synchronizing using said demodulated one or more synchronization signals.

The above defined devices are preferably comprised in a base station device, and in a mobile station device or a relay device, respectively. Note also that defined devices may be modified according to different embodiments of the non-limiting embodiments of method according to the disclosure.

Finally, it should be understood that the present disclosure is not limited to the embodiments described above, but also relates to and incorporates all embodiments within the scope of the appended claims.

The invention claimed is:

1. A base station, comprising:
   a processor, configured to obtain a first set of discrete Fourier frequency coefficients $H_u$, and transform the first set of discrete Fourier frequency coefficients $H_u$ into a time domain signal, wherein the first set of discrete Fourier frequency coefficients $H_u$ is of m frequency shifts from a second set of discrete Fourier frequency coefficients $\tilde{H}_u$, m is an integer except zero, the second set of discrete Fourier frequency coefficients $\tilde{H}_u$ corresponds to a number sequence $d_u[n]$, n=0, 1, ..., L-1, the length of the number sequence is L, the number sequence is centrally symmetric around an element n=(L-1)/2 of the number sequence, L is an odd positive integer and n denoting an element index of the number sequence;
   a transmitter, configured to transmit the time domain signal for facilitating synchronization in the wireless communication system.

2. The base station according to claim 1, wherein the time domain signal is a discrete time domain signal.

3. The base station according to claim 2, wherein the first set of discrete Fourier frequency coefficients $H_u$ is transformed into the discrete time domain signal in accordance with:

$$s_u[k] = \frac{1}{N}\sum_{n=0}^{N-1} H_u[n] W_N^{-kn}, k = 0, 1, \ldots, N-1,$$

where $$W_N = \exp\left(-\frac{j2\pi}{N}\right),$$

j=$\sqrt{-1}$, N is a positive integer larger than or equal to L.

4. The base station according to claim 1, wherein the time domain signal is a continuous time domain signal.

5. The base station according to claim 4, wherein the first set of discrete Fourier frequency coefficients $H_u$ is transformed into the discrete time domain signal in accordance with:

$$s_u(t) = \sum_{k=-N/2}^{N/2-1} H_u[k] \cdot e^{j2\pi k \Delta f t}, 0 \leq t < \frac{1}{\Delta f} = N \cdot T_s,$$

where $T_s$ is a sampling period and $\Delta f$ is a subcarrier frequency spacing of the wireless communication system.

6. The base station according to claim 1, wherein the second set of discrete Fourier frequency coefficients $\tilde{H}_u$ is a set of centrally symmetric discrete Fourier frequency coefficients.

7. The base station according to claim 1, wherein the number sequence is mapped on the second set of discrete Fourier frequency coefficients $\tilde{H}_u$ in accordance with:

$$\tilde{H}_u[l] = \begin{cases} d_u\left[l + \frac{L-1}{2}\right], & l = 0, 1, \ldots, \frac{L-1}{2} \\ d_u\left[l - N + \frac{L-1}{2}\right], & l = N - \frac{L-1}{2}, \ldots, N-1 \\ 0, & \text{elsewhere.} \end{cases}$$

where N is a positive integer larger than or equal to L, and l=0, 1, ... N−1.

8. The base station according to claim 1, wherein a modulo operation involving m and N is used for frequency shifting the second set of discrete Fourier frequency coefficients $\tilde{H}_u$ by m shifts to obtain the first set of discrete Fourier frequency coefficients $H_u$, where N is a positive integer larger than or equal to L.

9. The base station according to claim 8, wherein the frequency shifting is performed in accordance with:

$H_u[l] = \tilde{H}_u[(l+m) \bmod N]$, wherein $l=0,1,\ldots,N-1$.

10. The base station according to claim 1, wherein the number sequence fulfils a condition of $d_u[(L-1)/2]=0$.

11. A terminal, comprising:
a receiver, configured to receive a time domain signal and demodulate the time domain signal, wherein the time domain signal is transformed from a first set of discrete Fourier frequency coefficients $H_u$, the first set of discrete Fourier frequency coefficients $H_u$ is of m frequency shifts from a second set of discrete Fourier frequency coefficients $\tilde{H}_u$, m is an integer except zero, the second set of discrete Fourier frequency coefficients $\tilde{H}_u$ corresponds to a number sequence $d_u[n]$, n=0, 1, ..., L−1, the length of the number sequence is L, the number sequence is centrally symmetric around an element n=(L−1)/2 of the number sequence, L is an odd positive integer and n denoting an element index of the number sequence;
a processor, configured to facilitate synchronization by using the demodulated time domain signal.

12. The terminal according to claim 11, wherein the wireless communication system is an OFDM system employing at least one carrier frequency $f_c$ and a plurality of sub-carriers having a frequency spacing equal to $\Delta f$.

13. The terminal according to claim 12, wherein the carrier frequency f is a carrier frequency for 3GPP E-UTRA systems.

14. The terminal according to claim 12, wherein the time domain signal is demodulated using a local oscillator frequency $f_{LO}$ being equal to the carrier frequency $f_c$ plus m times the sub-carrier spacing $\Delta f$ so that $f_{LO}=f+m\cdot\Delta f$.

15. The terminal according to claim 12, wherein the time domain signal is demodulated using a local oscillator frequency $f_{LO}$ being equal to the carrier frequency $f_c$ so that $f_{LO}=f_c$.

16. The terminal according to claim 15, wherein the receiver is configured to:
add samples of the time domain signal prior to multiplication with a replica signal of the time domain signal.

17. The terminal according to claim 15, wherein the receiver is configured to:
mix the time domain signal with a complex exponential function having a periodicity depending on the m prior to multiplication with a replica signal of the time domain signal.

18. The terminal according to claim 15, wherein the receiver is configured to:
block process the time domain signal using a complex exponential function having a periodicity depending on the m prior to multiplication with a replica signal of the time domain signal.

19. The terminal according to claim 11, wherein the number sequence $d_u[n]$, n=0, 1, ..., L−1 is a Zadoff-Chu sequence of length 63 with a root index u being equal to at least one of 25, 29 and 34.

20. The terminal according to claim 11, wherein the number sequence $d_u[n]$, n=0, 1, ..., L−1 is a Zadoff-Chu sequence of length 63 with a root index u being other than any of 25, 29 and 34.

* * * * *